United States Patent
Chan et al.

(10) Patent No.: US 10,152,500 B2
(45) Date of Patent: Dec. 11, 2018

(54) READ MOSTLY INSTANCES

(71) Applicant: Oracle International Corporation, Redwood Shores, CA (US)

(72) Inventors: Wilson Wai Shun Chan, San Mateo, CA (US); Chandrajith Ramachandran Unnithan, Union City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 229 days.

(21) Appl. No.: 13/829,103

(22) Filed: Mar. 14, 2013

(65) Prior Publication Data

US 2014/0279840 A1    Sep. 18, 2014

(51) Int. Cl.
G06F 17/30    (2006.01)

(52) U.S. Cl.
CPC .............. *G06F 17/30312* (2013.01)

(58) Field of Classification Search
CPC ... G06F 2003/0692; G06F 2009/45595; G06F 2009/45587; G06F 12/0828; G06F 12/1466
See application file for complete search history.

(56) References Cited

U.S. PATENT DOCUMENTS

| | | | |
|---|---|---|---|
| 4,507,751 A | 3/1985 | Gawlick et al. | |
| 4,710,926 A | 12/1987 | Brown et al. | |
| 4,782,325 A | 11/1988 | Jeppsson et al. | |
| 4,945,474 A | 7/1990 | Elliott et al. | |
| 5,095,421 A | 3/1992 | Freund | |
| 5,146,571 A | 9/1992 | Logan | |
| 5,182,752 A | 1/1993 | DeRoo et al. | |
| 5,233,618 A | 8/1993 | Gilder et al. | |
| 5,241,675 A | 8/1993 | Sheth et al. | |
| 5,263,156 A | 11/1993 | Bowen et al. | |
| 5,287,496 A | 2/1994 | Chen et al. | |
| 5,327,556 A | 7/1994 | Mohan | |

(Continued)

FOREIGN PATENT DOCUMENTS

| | | |
|---|---|---|
| EP | 0 503 417 A2 | 9/1992 |
| EP | 2 608 070 A1 | 6/2013 |

(Continued)

OTHER PUBLICATIONS

Teschke, et al., "Concurrent Warehouse Maintenance Without Comprising Session Consistency", 1998, 10 pages.

(Continued)

*Primary Examiner* — Augustine K. Obisesan
(74) *Attorney, Agent, or Firm* — Hickman Palermo Becker Bingham LLP (57) ABSTRACT

According to one aspect of the invention, a read-write instance of a multiple-instance database system receives a database statement for execution. The multiple-instance database system comprises a database shared by a plurality read-mostly instances that request only read access to a plurality of user database objects in the database and a plurality of read-write instances that request both read access and write access to the plurality of user database objects. The read-write instance selects one or more read-mostly instances, in the plurality of read-mostly instances, to perform one or more operations that require no write access to the plurality of user data objects.

19 Claims, 3 Drawing Sheets

(56) References Cited

U.S. PATENT DOCUMENTS

| | | |
|---|---|---|
| 5,329,628 A | 7/1994 | Yomamoto et al. |
| 5,333,316 A | 7/1994 | Champagne et al. |
| 5,355,477 A | 10/1994 | Strickland et al. |
| 5,369,757 A | 11/1994 | Spiro et al. |
| 5,388,196 A | 2/1995 | Pajak et al. |
| 5,418,940 A | 5/1995 | Mohan |
| 5,487,164 A | 1/1996 | Kirchhofer et al. |
| 5,553,279 A | 9/1996 | Goldring |
| 5,559,991 A | 9/1996 | Kanfi |
| 5,581,753 A | 12/1996 | Terry et al. |
| 5,581,754 A | 12/1996 | Terry et al. |
| 5,588,012 A | 12/1996 | Oizumi |
| 5,603,024 A | 2/1997 | Goldring |
| 5,613,113 A | 3/1997 | Goldring |
| 5,696,775 A | 12/1997 | Nemazie et al. |
| 5,717,893 A | 2/1998 | Mattson |
| 5,734,898 A | 3/1998 | He |
| 5,742,792 A | 4/1998 | Yanai et al. |
| 5,778,430 A | 7/1998 | Ish et al. |
| 5,805,799 A | 9/1998 | Fredrickson et al. |
| 5,870,759 A | 2/1999 | Bauer et al. |
| 5,870,763 A | 2/1999 | Lomet |
| 5,893,930 A | 4/1999 | Song |
| 5,960,436 A | 9/1999 | Chang et al. |
| 5,983,277 A | 11/1999 | Heile et al. |
| 6,009,432 A | 12/1999 | Tarin |
| 6,009,542 A | 12/1999 | Koller et al. |
| 6,026,406 A | 2/2000 | Huang et al. |
| 6,044,367 A | 3/2000 | Wolff |
| 6,067,550 A | 5/2000 | Lomet |
| 6,094,708 A | 7/2000 | Hilla et al. |
| 6,098,190 A | 8/2000 | Rust et al. |
| 6,151,607 A | 11/2000 | Lomet |
| 6,192,377 B1 | 2/2001 | Ganesh et al. |
| 6,226,650 B1 | 5/2001 | Mahajan |
| 6,272,500 B1 | 8/2001 | Sugita |
| 6,298,319 B1 | 10/2001 | Heile et al. |
| 6,298,425 B1 | 10/2001 | Whitaker et al. |
| 6,324,661 B1 | 11/2001 | Gerbault et al. |
| 6,353,835 B1 | 3/2002 | Lieuwen |
| 6,393,485 B1 | 5/2002 | Chao et al. |
| 6,438,724 B1 | 8/2002 | Cox et al. |
| 6,446,234 B1 | 9/2002 | Cox et al. |
| 6,449,623 B1 | 9/2002 | Bohannon et al. |
| 6,516,327 B1 | 2/2003 | Zondervan et al. |
| 6,523,032 B1* | 2/2003 | Sunkara ............ G06F 17/30445 |
| 6,535,869 B1 | 3/2003 | Housel, III |
| 6,560,743 B2 | 5/2003 | Plants |
| 6,574,717 B1 | 6/2003 | Ngai et al. |
| 6,728,879 B1 | 4/2004 | Atkinson |
| 6,732,125 B1 | 5/2004 | Autrey et al. |
| 6,775,681 B1 | 8/2004 | Ballamkonda |
| 6,804,671 B1 | 10/2004 | Loaiza et al. |
| 6,839,751 B1 | 1/2005 | Dietz et al. |
| 6,886,084 B2 | 4/2005 | Kawashima et al. |
| 6,980,988 B1 | 12/2005 | Demers et al. |
| 7,024,656 B1 | 4/2006 | Ahad |
| 7,136,970 B2 | 11/2006 | Yoshiya et al. |
| 7,149,769 B2 | 12/2006 | Lubbers et al. |
| 7,149,858 B1 | 12/2006 | Kiselev |
| 7,228,354 B2 | 6/2007 | Chambliss et al. |
| 7,237,027 B1 | 6/2007 | Raccah et al. |
| 7,246,275 B2 | 7/2007 | Therrien et al. |
| 7,257,689 B1 | 8/2007 | Baird |
| 7,363,538 B1 | 4/2008 | Joydip et al. |
| 7,370,068 B1 | 5/2008 | Pham et al. |
| 7,599,967 B2 | 10/2009 | Girkar et al. |
| 7,600,063 B2* | 10/2009 | Loaiza ................ G06F 9/526 710/200 |
| 7,627,612 B2 | 12/2009 | Ahal et al. |
| 7,627,614 B2 | 12/2009 | Hu et al. |
| 7,734,580 B2 | 6/2010 | Lahiri et al. |
| 7,761,425 B1 | 7/2010 | Erickson et al. |
| 7,822,717 B2 | 10/2010 | Kappor et al. |
| 7,895,216 B2 | 2/2011 | Longshaw et al. |
| 7,966,293 B1 | 6/2011 | Owara et al. |
| 7,996,363 B2 | 8/2011 | Girkar et al. |
| 8,024,396 B2* | 9/2011 | Sedukhin ............ H04L 67/16 709/201 |
| 8,286,182 B2 | 10/2012 | Chan |
| 8,364,648 B1 | 1/2013 | Sim-Tang |
| 8,433,684 B2 | 4/2013 | Munoz |
| 8,468,320 B1 | 6/2013 | Stringham |
| 8,473,953 B2 | 6/2013 | Bourbonnais |
| 8,478,718 B1 | 7/2013 | Ranade |
| 8,560,879 B1 | 10/2013 | Goel |
| 8,615,578 B2 | 12/2013 | Hu et al. |
| 8,694,733 B2* | 4/2014 | Krishnan et al. .............. 711/133 |
| 8,832,142 B2 | 9/2014 | Marwah et al. |
| 8,838,919 B2 | 9/2014 | Shi et al. |
| 8,856,484 B2 | 10/2014 | Ben-Tsion et al. |
| 8,868,492 B2 | 10/2014 | Garin et al. |
| 8,868,504 B2 | 10/2014 | Aranna et al. |
| 8,930,312 B1 | 1/2015 | Rath |
| 9,026,679 B1 | 5/2015 | Shmuylovich |
| 9,077,579 B1* | 7/2015 | Chu |
| 9,146,934 B2 | 9/2015 | Hu et al. |
| 9,244,996 B2 | 1/2016 | Bourbonnais |
| 9,767,178 B2 | 9/2017 | Srivastava et al. |
| 2002/0049950 A1 | 4/2002 | Loaiza et al. |
| 2002/0091718 A1 | 7/2002 | Bohannon et al. |
| 2002/0112022 A1 | 8/2002 | Kazar et al. |
| 2002/0133508 A1 | 9/2002 | LaRue et al. |
| 2002/0143755 A1 | 10/2002 | Wynblatt et al. |
| 2002/0165724 A1 | 11/2002 | Blankesteijn |
| 2003/0046396 A1 | 3/2003 | Richter et al. |
| 2003/0061537 A1 | 3/2003 | Cha et al. |
| 2003/0126114 A1* | 7/2003 | Tedesco ............ G06F 17/30427 |
| 2003/0140288 A1 | 7/2003 | Loaiza et al. |
| 2003/0212660 A1* | 11/2003 | Kerwin .............. G06F 17/3056 |
| 2003/0217064 A1* | 11/2003 | Walters .................. G06F 9/466 |
| 2003/0217071 A1 | 11/2003 | Kobayashi et al. |
| 2004/0003087 A1 | 1/2004 | Chambliss et al. |
| 2004/0062106 A1 | 4/2004 | Ramesh et al. |
| 2004/0193570 A1 | 9/2004 | Yaegar |
| 2004/0267809 A1 | 12/2004 | East et al. |
| 2005/0038831 A1 | 2/2005 | Souder et al. |
| 2005/0055380 A1 | 3/2005 | Thompson et al. |
| 2005/0120025 A1 | 6/2005 | Rodriguez et al. |
| 2005/0165798 A1 | 7/2005 | Cherkauer et al. |
| 2006/0004691 A1 | 1/2006 | Sifry |
| 2006/0015542 A1* | 1/2006 | Pommerenk ........ G06F 11/1469 |
| 2006/0047713 A1 | 3/2006 | Gornshtein |
| 2006/0064405 A1 | 3/2006 | Jiang et al. |
| 2006/0080646 A1* | 4/2006 | Aman ..................... G06F 9/453 717/143 |
| 2006/0129559 A1* | 6/2006 | Sankaran ............ G06F 11/2082 |
| 2006/0168585 A1* | 7/2006 | Grcevski .................. G06F 9/526 718/104 |
| 2006/0173833 A1 | 8/2006 | Purcell et al. |
| 2006/0200497 A1 | 9/2006 | Hu et al. |
| 2006/0212481 A1 | 9/2006 | Stacey et al. |
| 2006/0212573 A1* | 9/2006 | Loaiza et al. .................. 709/225 |
| 2006/0224551 A1 | 10/2006 | Lariba-Pey |
| 2006/0242513 A1 | 10/2006 | Loaiza et al. |
| 2007/0038689 A1 | 2/2007 | Shinkai |
| 2007/0083505 A1 | 4/2007 | Ferrari et al. |
| 2007/0100912 A1 | 5/2007 | Pareek et al. |
| 2007/0156957 A1 | 7/2007 | McHardy et al. |
| 2007/0226277 A1 | 9/2007 | Holenstein et al. |
| 2007/0239680 A1 | 10/2007 | Oztekin et al. |
| 2008/0005112 A1 | 1/2008 | Shavit |
| 2008/0016074 A1 | 1/2008 | Ben-dyke et al. |
| 2008/0059492 A1 | 3/2008 | Tarin |
| 2008/0104283 A1 | 5/2008 | Shin et al. |
| 2008/0126846 A1 | 5/2008 | Vivian et al. |
| 2008/0147599 A1 | 6/2008 | Young-Lai |
| 2008/0177803 A1 | 7/2008 | Fineberg et al. |
| 2008/0222311 A1 | 9/2008 | Lee |
| 2008/0228835 A1 | 9/2008 | Lashley et al. |
| 2008/0244209 A1 | 10/2008 | Seelam et al. |
| 2008/0256143 A1 | 10/2008 | Reddy et al. |
| 2008/0256250 A1 | 10/2008 | Wakefield et al. |
| 2008/0281784 A1 | 11/2008 | Zane et al. |

(56) References Cited

U.S. PATENT DOCUMENTS

| | | | |
|---|---|---|---|
| 2008/0281865 | A1 | 11/2008 | Price et al. |
| 2009/0024384 | A1 | 1/2009 | Kobayashi et al. |
| 2009/0034377 | A1 | 2/2009 | English et al. |
| 2009/0063591 | A1 | 3/2009 | Betten et al. |
| 2009/0119295 | A1 | 5/2009 | Chou et al. |
| 2009/0182746 | A1* | 7/2009 | Mittal et al. ............ 707/8 |
| 2009/0248756 | A1* | 10/2009 | Akidau ............ G06F 11/004 |
| 2009/0268903 | A1 | 10/2009 | Bojinov et al. |
| 2009/0307290 | A1 | 12/2009 | Barsness et al. |
| 2010/0036843 | A1 | 2/2010 | MacNaughton et al. |
| 2010/0082648 | A1 | 4/2010 | Potapov |
| 2010/0122026 | A1 | 5/2010 | Umaamageswaran et al. |
| 2010/0145909 | A1 | 6/2010 | Ngo |
| 2010/0211577 | A1 | 8/2010 | Shimuzu et al. |
| 2010/0235335 | A1 | 9/2010 | Heman et al. |
| 2010/0250549 | A1 | 9/2010 | Muller et al. |
| 2010/0318570 | A1 | 12/2010 | Narasinghanallur et al. |
| 2011/0004586 | A1 | 1/2011 | Cherryholmes et al. |
| 2011/0029569 | A1 | 2/2011 | Ganesh et al. |
| 2011/0060724 | A1 | 3/2011 | Chan |
| 2011/0066791 | A1 | 3/2011 | Goyal et al. |
| 2011/0087633 | A1 | 4/2011 | Kreuder et al. |
| 2011/0087637 | A1 | 4/2011 | Sundaram et al. |
| 2011/0099179 | A1 | 4/2011 | Balebail |
| 2011/0138123 | A1 | 6/2011 | Aditya et al. |
| 2011/0145207 | A1 | 6/2011 | Agrawal et al. |
| 2011/0231362 | A1 | 9/2011 | Attarde et al. |
| 2011/0238655 | A1* | 9/2011 | Colrain et al. ............ 707/718 |
| 2011/0307450 | A1 | 12/2011 | Hahn et al. |
| 2012/0054158 | A1 | 3/2012 | Hu et al. |
| 2012/0054533 | A1 | 3/2012 | Shi et al. |
| 2012/0109926 | A1 | 5/2012 | Novik et al. |
| 2012/0173515 | A1 | 7/2012 | Jeong et al. |
| 2012/0278282 | A1 | 11/2012 | Lu |
| 2012/0284228 | A1 | 11/2012 | Ghosh |
| 2012/0323849 | A1 | 12/2012 | Garin et al. |
| 2012/0323971 | A1 | 12/2012 | Pasupuleti |
| 2013/0085742 | A1 | 4/2013 | Baker et al. |
| 2013/0117237 | A1 | 5/2013 | Thomsen et al. |
| 2013/0132674 | A1 | 5/2013 | Sundrani |
| 2013/0198133 | A1 | 8/2013 | Lee |
| 2013/0212068 | A1 | 8/2013 | Talius et al. |
| 2014/0040218 | A1 | 2/2014 | Kimura et al. |
| 2014/0059020 | A1 | 2/2014 | Hu et al. |
| 2014/0075493 | A1 | 3/2014 | Krishnan et al. |
| 2014/0095452 | A1 | 4/2014 | Lee et al. |
| 2014/0095530 | A1 | 4/2014 | Lee et al. |
| 2014/0095546 | A1 | 4/2014 | Kruglikov et al. |
| 2014/0164331 | A1 | 6/2014 | Li et al. |
| 2014/0279840 | A1 | 9/2014 | Chan et al. |
| 2015/0032694 | A1 | 1/2015 | Rajamani et al. |
| 2015/0088811 | A1 | 3/2015 | Hase et al. |
| 2015/0088822 | A1 | 3/2015 | Raja et al. |
| 2015/0088824 | A1 | 3/2015 | Kamp et al. |
| 2015/0088830 | A1 | 3/2015 | Kamp et al. |
| 2015/0088926 | A1 | 3/2015 | Chavan et al. |
| 2015/0089125 | A1 | 3/2015 | Mukherjee et al. |
| 2015/0089134 | A1 | 3/2015 | Mukherjee et al. |
| 2015/0120659 | A1 | 4/2015 | Srivastava et al. |
| 2015/0254240 | A1 | 9/2015 | Li et al. |
| 2016/0179867 | A1 | 6/2016 | Li et al. |
| 2017/0116252 | A1 | 4/2017 | Krishnaswamy |
| 2018/0121511 | A1 | 5/2018 | Li |
| 2018/0165324 | A1 | 6/2018 | Krishnaswamy |

FOREIGN PATENT DOCUMENTS

| | | |
|---|---|---|
| GB | 1 332 631 A | 10/1973 |
| GB | 2505 185 A | 2/2014 |
| JP | 59-081940 | 5/1984 |
| JP | 02-189663 | 7/1990 |
| JP | 08-235032 | 9/1996 |
| JP | 10-040122 | 2/1998 |
| JP | 10-240575 | 9/1998 |
| WO | WO 2007/078444 A1 | 7/2007 |

OTHER PUBLICATIONS

Vassilakis et al., "Implementation of Transaction and Concurrency Control Support in a Temporal DBMS" Information Systems, vol. 23, No. 5, 1998, 16 pages.

Bober et al., "On Mixing Queries and Transactions via Multiversion Locking", IEEE, 1992, 11 pages.

Mohan et al., "Efficient and Flexible Methods for Transient Versioning of Records to Avoid Locking by Reading-Only Transactions", XP 000393583, IBM Almaden Research Center, Dated Feb. 6, 1992, 11 pages.

Rajeev Kumar et al., Oracle DBA, A Helping Hand, Container Database and Pluggable Database (CDB & PDB), retrieved from the internet on Dec. 4, 2013, 2 pages.

Preimesberger, Chris, "Oracle Profits Up, but Revenues Slip" Oracle, dated Sep. 20, 2012, 2 pages.

Oracle Help Center, "Database 2 Day + Data Replication and Integration Guide", 3 Accessing and Modifying Information in Multiple Databases, dated 2016, 14 pages.

Oracle Base, Multitenant: Create and Configure a Pluggable Database (PDB) in Oracle Database 12c Release 1 (12.1), dated Jan. 8, 2014, 16 pages.

Muhammad Anwar, "How to Install Oracle 12c Multitenant Pluggable Database", Dated Feb. 24, 2012, 27 pages.

Garcia-Molina et al., "Database System Implementation", dated Jan. 1, 2000, 84 pages.

Francisco Munoz et al., "Oracle Database 12c Backup and Recovery Survival Guide", dated Sep. 24, 2013, 8 pages.

Dominic Betts et al., "Developing Multi-Tenant Applications for the Cloud", 3rd Edition, Microsoft, 2012, 246 pages.

Das et al., "Albatross: Lightweight Elasticity in Shared Storage Databases for the Cloud Using Live Data Migration", Proceedings of the VLDB Endowment, vol. 4 No. 8 Copyright, dated 2011, 12 pages.

Anonymous: "Oracle-Base—Multitenant: Overview of Container Databases (CDB) and Pluggable Databases (PDB)", dated Mar. 3, 2014, 4 pages.

Anonymous, :An Oracle White Paper Oracle Database Appliance: Migration Strategies, dated Jun. 2012, 14 pages.

Zhe, Li, et al., "PERF join: an alternative to two-way semijoin and Bloomjoin" Proceedings of the 1995 ACM, New York. NY, US., 1995, pp. 187-144.

Shao et al., "Clotho: Decoupling Memory Page Layout from Storage Organization", Proceedings of the 30th VLDB Conference, Toronto, Canada, 2004, 12 pages.

Schaffner et al., "A Hybrid Row-Column OLTP Database Architecture for Operational Reporting", dated Aug. 24, 2008, 14 pages.

Ramamurthy, Ravishankar, "A Case for Fractured Mirrors" Proceedings of the 28th VLDB Conference, dated, 2002, 12 pages.

Phipps, Colin:, "Mapping Deflated Files", Internet Article, dated Jan. 6, 2013, http://zsync.moria.org.uk/paper/ch03s02.html, 3 pages.

Oracle Database Administrator's Guide, 11g Release 2 (11.2), Chapter 26, Feb. 2010, 54 pages. http://download.oracle.com/docs/cd/E11882_01/server.112/e10595.pdf.

Oracle Database Administrator's Guide, 10g Release 2 (10.2), Chapter 24, May 2006, 34 pages. http://download.oracle.com/docs/cd/B19306_01/server.102/b14231.pdf.

O'Neil, P., et al., "Multi-table joins through bitmapped join indices", SIGMOD Record, ACM, New York, NY, US, vol. 24, No. 3, Sep. 1, 1995, pp. 8-11, ISSN: 0163-5808.

Nirmesh, Malviya, "Recovery Algorithms for In-Memory OLTP Databases", Master of Science Thesis, dated Jul. 1, 2012, 66 pages.

Loizos, M., et al., "Improving distributed join efficiency with extended bloom filter operations", Advanced Networking and Applications, 2007. AINA '07., 21st international Conf. IEEE, May 1, 2007.

Mackert, F. Lothar et al., "R* optimizer validation and performance evaluation for local queries" SIGMOD Record, ACM, New York, NY, US., vol. 15, No. 2, Jun. 1, 1986, pp. 84-95, ISSN: 0163-5808.

IBM, "A Scheduling Algorithm for Processing Mutually Exclusive Workloads in a Multi-System Configuration", dated Aug. 19, 2002, IEEE, 3 pages.

(56) References Cited

OTHER PUBLICATIONS

Zhang Ho et al., "In-Memory Big Data Management and Processing: A Survery", IEEE Transactions on Knowledge and Data Engineering, vol. 27, No. 7, dated Jul. 31, 2015, 30 pages.

Vishal Sikka et al., "Efficient Transaction Processing in SAP Hana Database", Proceedings of the 2012, International Conference on Management of Data, dated Jan. 31, 2012, 12 pages.

Farber et al., "SAP HANA Database—Data Management for Modern Business Applications", SIGMOD Record, dated Dec. 2011, vol. 40, No. 4, 8 pages.

Khalid Sayood:, "Introduction to data Compression", Morgan Kaufmann Publisher, dated Dec. 1996, 4 pages.

Antoni Cau, et al., "Specifying Fault Tolerance within Stark's Formalism," 1993, IEEE, pp. 392-401.

IBM Corp., "IBM OS/2 Extended Edition Configuration," Feb. 1990, IBM Technical Disclosure Bulletin, vol. 32, No. 9B, pp. 446-451.

Alapati, S., Backing Up Databases. In: Expert Oracle Database 11g Administration, Apress, dated 2009, pp. 1-70.

Oracle, "Oracle Data Guard", Concepts and Administration 12c Release 1 (12.1), dated Nov. 2015, 50 pages.

Oracle, "Oracle Active Data Guard", Real-Time Protection and Availability, Oracle White Paper, dated Oct. 2015, 22 pages.

Oracle, "Maximum Availability Architecture", Oracle Best Practices for High Availability, dated Sep. 2011, 42 pages.

\* cited by examiner

READ MOSTLY INSTANCES

TECHNICAL FIELD

The present invention relates to database and, more specifically, to multiple-instance database systems.

BACKGROUND

Online transaction processing (OLTP) systems support high transaction-oriented applications. The workload of OLTP entails frequent updates that each involves modifications to relatively small amounts database data and entails execution of many queries that each access and generate relatively small amounts of data. Important capabilities of the clustered database systems supporting OLTP workloads include not only high availability but also transaction processing of database data. While these capabilities are important to supporting OLTP workloads, the capabilities exact high overhead.

The database data generated by OLTP can be exploited by decision support systems (DSS). DSS generates analytic data from raw database data, such as that generated by OLTP systems. The workload of DSS entails execution of queries requiring much computation and accessing a large volume of data.

Under database consolidation, OLTP systems and DSS may be hosted on the same clustered database system. Database consolidation not only allows for more efficient use of computer resources but also provides a DSS system better access to the raw database data generated by the OLTP system. However, the DSS work load is subjected to the overhead needed by OLTP to support high availability and transaction processing, which impairs the scalability of clustered database systems used for consolidating OLTP and DSS systems.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A multiple-instance database system (or a cluster database system) is a cluster comprising multiple database server "instances" (or "nodes") that together manage a database. Multiple types of applications/workloads may be concurrently performed in a multiple-instance database system. Example types of applications/workloads include, but are not limited only to, OLTP that generates numerous updates/writes to various data resources (e.g., data blocks, database files, SQL tables, etc.) in a database (e.g., 108) in the system (e.g., 100), DSS or data warehouse applications that executes parallel queries against a large number of data resources in the database 108 in the system 100, etc.

In a system comprising a relatively small number of instances, it may be acceptable for the system to have a mixture of different types of applications/workloads, as contentions among the instances may be easily handled with a limited number of potential contenders for resources in the system.

In a system comprising a relatively large number (e.g., 100's, 1000's, etc.) of instances, however, it could be problematic to host a mixture of different applications/workloads, as contentions and communication overheads among the instances might be difficult to handle with a large number of potential contenders or communication parties for resources in the system. Particularly, message protocols implemented in the system may require broadcast messages of certain types to every instance in the system.

Under some approaches, each instance in the system could obtain locks to certain resources that would block lock requests of all other instances. Thus, messaging protocols used to lock resources could be frequently invoked in OLTP or other update types of applications/workloads. The resultant lock contentions and message broadcasts could lead to performance degradation when a large number of contenders for resources exist in the system.

Under some other approaches, different databases (e.g., comprising the same data in different states) can be maintained for different types of applications/workloads. For example, a first database may be used to support OLTP and a second database may be used to support DSS. Database objects from the first database can be copied to the second databases from time to time (e.g., daily, weekly, monthly, etc.) to provide relatively recent database objects—but not the same up-to-date database objects used to support OLTP—to DSS. Replication of database objects between two databases helps resolve or avoid resource contention, but introduces significant latency, complexity and costs in a system.

Under techniques as described herein, in contrast, the same (e.g., relational) database system is maintained for and shared by all types of applications/workloads in a multiple-instance database system. Different types of applications/workloads are not restricted to their isolated databases but rather are supported by a combination of read-write instances and read-only instances that share the same database.

Specifically, some instances in the system under techniques as described herein are configured as read-mostly instances on which a database server process can perform operations that only require read access to user database objects in the (shared) database. Some other instances in the system are configured as read-write instances on which a database server process can perform operations that require read access, write access and both read-and-write access, to user database objects in the (shared) database.

A combination of read-mostly instances and read-write instances in a multiple-instance database system under techniques as described herein allow the same database to be capable of handling a variety of different types of applications/workloads including but not limited to OLTP, DSS, data warehousing, etc., without sacrificing performance.

For example, a coordinator process in a read-write instance can be configured to select and assign only read-only operations to read-mostly instances in the system. While one coordinator process selects and assigns one or more read-mostly instances to run parallel queries in DSS, another coordinator process can select and assign one or more read-write instances to perform OLTP operations including but not limited to write operations in database transactions.

A coordinator process—which may be a part of, or operate in conjunction with, a parallel query engine—can be configured to (e.g., automatically) determine whether a database statement should be offloaded to read-mostly instances, determine the number of parallel database server processes to be allocated to the read-mostly instances and/or to run completely in memory in the read-mostly instances, determine how to allocate parallel database server processes among the read-mostly instances and read-write instances when the database statement is to be executed on both read-mostly instances and read-write instances.

One or more of these determinations may be based in part on several factors including but not limited to one or more of availability and configuration of read-mostly instances, availability of read-write instances, runtime conditions, types of applications/workloads the database statement represents, types of database operations involved in the database statement, types of database files or resources to be accessed, types of locks expected to be requested, a desired degree of parallelism, database statistics, response time requirements, numbers of database files and/or resources to be locked and accessed, etc. One or more of these determinations can also be based on what data is currently residing in the buffer cache of the read-mostly instance(s). If a query needs to access the data currently in one or a few read-mostly instances, the coordinator can allocate parallel processes to run on those instances.

The database statement may be a Data Definition Language (DDL) or Data Manipulation Language (DML) statement that invokes operations that write to the (relational) database. In some embodiments, to reduce the amount of writes from read-mostly instances, parallel servers in read-mostly instances are configured not to execute DML and DDL row-sources (e.g., individual steps or operations of a database statement). Rather, only parallel servers in read-write instances are configured to execute DML and DDL row-sources.

System Overview

Generally, an instance, such as a database server instance, in a multiple-instance database system is a combination of integrated software components and an allocation of computational resources, such as memory, a node, and processes on the node for executing the integrated software components, where the combination of the software and computational resources are dedicated to providing a particular type of function on behalf of clients of the database server instance. A database server instance (or an instance herein) comprises one or more database server processes that read data from and/or write data to the database located on shared storage. Instances may communicate with other instances and the shared storage through a network and/or other communication mechanisms. A database server process in an instance may comprise or represent one or more of processing modules, threads of execution, slave processes, operators in an execution plan, consumer processes, producer processes, scan operations, sort operations, etc.

Multiple-instance database systems offer many benefits not available in alternative data processing configurations. The computational power offered by a system of relatively inexpensive instances often rivals the computational power offered by a single, much more expensive, computing device. Individual instances can be added to or removed from a system according to need. Thus, a multiple-instance database system can be highly scalable. Even when one instance in a system fails, other instances in the system may continue to provide services. Thus, a multiple-instance database system can be highly available and/or fault-tolerant.

In a multiple-instance database system, instances (e.g., database server processes thereon) often compete for "shared data resources," such as for example, blocks of data (referred to as "data blocks" or "blocks" herein) in a database. A shared data resource may be concurrently accessed by a number of instances if accesses by the instances are compatible. A shared data resource may be blocked from being accessed by an instance if the access sought by the instance is incompatible with existing accesses that have already been granted to other instances.

A data block is an atomic unit of persistent storage used by a database to store database records (e.g. rows of a table). When a row needs to be accessed from persistent storage, the entire data block containing the row is copied into a data block buffer in volatile memory (e.g., buffer cache) of a database server. A data block usually contains multiple rows, and control and formatting information (e.g., offsets to sequences of bytes representing rows or other data structures, list of transactions affecting a row, a system change number (SCN) of a recent change to the data block, etc.). A data block's size is typically fixed, e.g., 8 KB. The size of a data block may be based on the properties of the shared storage (or disk) on which data is stored and/or the mechanism that is used to read and write data to the shared storage.

An SCN is a logical number assigned to a transaction (or a part therein), a begin-transaction record, a change record in a transaction, an end-transaction record in a transaction, a data change in a data block, etc. SCNs are issued in a time order (e.g., increment over the time) and thus each SCN represents a logical time relative to other SCNs. A commit SCN associated with a transaction (or an end-transaction record therein) indicates a logical time at which the transaction was committed within the database.

A master (or resource master) can be configured to coordinate access by any of all instances (or database server processes thereon) in the multiple-instance database system to a shared data resource. A lock mechanism may be used by a master to coordinate access to data blocks or database objects, such as a row, table, or table partition. An exclusive lock may be issued to allow an instance (or a database server process thereon) to perform any read/write access, while a consistent read lock may be issued to allow a instance (or a database server process thereon) to perform read-only access. As used herein, a consistent read is designed to provide data from the database that reflects the state of the database up to a time which, for example, may be logically represented by an SCN. The term "master" as used herein may also refer to an instance on which a system process (a master) that coordinates access to a resource resides. One example of a master is described in U.S. Pat. No. 7,917,596 B2, entitled "Super Master," and issued on Mar. 29, 2011, and is incorporated herein by reference for all purposes as if fully set forth herein. One example of a lock management system is described in U.S. Pat. No. 6,363,396, entitled "Object Hashing With Incremental Changes," and issued on Mar. 26, 2002, and is incorporated herein by reference for all purposes as if fully set forth herein.

Figure 1:
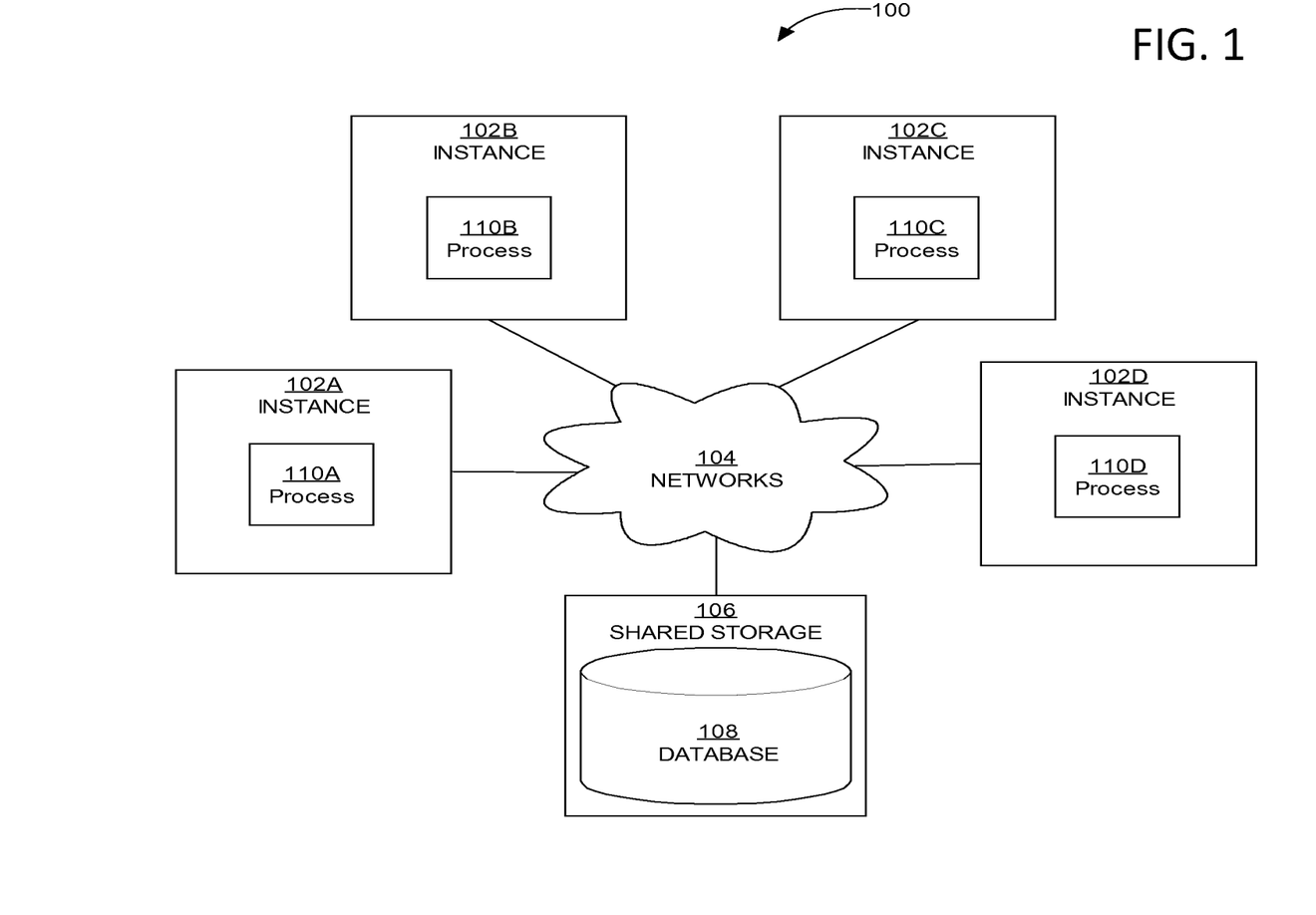
FIG. 1 is a block diagram that depicts an example multiple-instance database system 100, according to an embodiment of the present invention.

FIG. 1 is a block diagram that depicts an example multiple-instance database system 100, according to an embodiment of the present invention. System 100 comprises one or more read-write instances (such as 102A and 102B) and one or more read-mostly instances (such as 102C and 102D). Each of the instances has one or more processors. Each of the instances is coupled communicatively with a network 104. The network 104 may be a high speed network such as an infiniband network.

System 100 also comprises a shared storage 106, which is also coupled communicatively with the network 104. Thus, through the network 104, instances 102A-D can access each other and shared storage 106.

The shared storage 106 may be, for example, a persistent storage mechanism such as a hard disk drive. The shared storage 106 contains a database 108. The database 108 comprises one or more data blocks. These blocks collectively contain database objects such as database tables. The database objects in the database 108 may comprise a plurality of user database objects and a plurality of system database objects. A system database object is generated by the system (or system processes) and cannot be modified or deleted by a database user or a database application. A user database object may be generated, modified and/or deleted by a database user or a database application. Unless disabled (e.g., logging and statistics generation disabled on a specific instance), a system database object such as system logs and system statistics can be write-accessed by an instance (e.g., through a system process thereon) while the instance is performing an operation (e.g., through a database server process) for a database user or a database application.

Techniques as described herein do not require read-mostly instances to have direct access to database objects (or files) in the shared database. Read-mostly instances may or may not have direct access to databases (or files) in the shared database. In some embodiments, at least one read-mostly instance can be configured with direct access to the database. In some embodiments, at least one read-mostly instance can be configured with no direct access to the database. The term "direct access" means that an instance can access a data, such as a data block in the shared storage, without having to request it from another instance. In some embodiments, IO operations generated by the read-mostly instance can be configured to go through some read-write instances. This can obviate any requirements to configure all instances with direct connections to the shared data storage 106.

Each of the instances comprises one or more database server processes. Database server processes in a read-write instance can perform read operations, write operations, or combinations thereof in relation to (or on) the plurality of user database objects in the database 108. Database server processes in a read-mostly instance, on the other hand, are restricted perform read operations in relation to (or on) the plurality of user database objects in the database 108. For the purpose of illustration only, a database server process 110A is in the instance 102A, a database server process 110B is in the instance 102B, a database server process 110C is in the instance 102C, and a database server process 110D is in the instance 102D. The database server processes 110A and 110B can perform read operations, write operations and combinations of read and write operations on at least some of the plurality of user database objects, because the database server processes 110A and 110B are part of read-write instances (102A and 102B in this example). The database server processes 110C and 110D, on the other hand, can only perform read operations but not write operations on any of the plurality of user database objects, because the database server processes 110C and 110D are part of read-mostly instances (102C and 102C in this example).

Read-Mostly Instances

A read-mostly instance (e.g., 102C, 102D, etc.) can be configured with some characteristics different from a read-write instance (e.g., 102A, 102B, etc.). For example, a read-mostly instance may be configured with a slightly higher IO latency than that of a read-write instance. The read-mostly instance may spawn or run database server processes that can be assigned with (e.g., portions of) operations of a database statement execution plan that do not require write access to any user database object to which access is required to compute or otherwise execute the database statement execution plan. Available in-memory copies of data blocks or portions of a data block can be provided to a database server process in a read-mostly instance in order to avoid unnecessary read access to persistently stored versions of the data blocks or portions of the data block in the database (e.g., 108). Zero, one or more system processes in the read-mostly instance may generate very little to no updates to user data and instead only update system database objects. For example, a read-mostly instance may perform limited updating such as update workload metrics generated in response to performing read-only operations. In this way, a read-mostly instance performs relatively little locking and generation of redo and/or undo logging in comparison with a read-write instance.

Processes that are not related to types of applications/workloads configured to be handled by read-mostly instances may be removed from or may not be configured to run in the read-mostly instances. These processes include but not limited to a large number of background processes or activities used to support other types of applications/workloads not configured to be handled by the read-mostly instances. For example, background workload processes such as user job schedulers that are not related to in-memory parallel query processing may be reduced or removed from the read-mostly instances.

In some embodiments, read-write instances form the core of a multiple-instance database system, whereas read-mostly instances can be used whenever available in the system. In some embodiments, at least one of the read-write instances is started before all read-mostly instances in the system. In some embodiments, when all read-write instances are out of service, the system may be shut down or restarted. In some embodiments, database users or database applications are allowed to connect to only read-write instances. For example, the system may provision user connection listeners and/or coordinator processes accessible by the users or applications at network addresses and ports of the read-write instances only. No such listeners for user connection requests may be provided with read-mostly instances. The system can be configured to receive users or applications' connection requests and accept user jobs only at the read-write instances. These user jobs may include but are not limited only to database statements (e.g., DDL, DML, query, etc.) for execution.

The read-mostly instance can be configured to access slightly out-of-date data. Read access to a slightly out-of copy of data by a read-mostly instance can be concurrently made when the data is being updated, or made available to be updated, by read-write instances. For example, a coordinator process that coordinates the execution of a database statement can be configured to assign one or more operations for the execution of a database statement to a database server process (which may be spawned by the coordinator process or which may have been spawned but is presently available) on the read-mostly instance, and provide the database server process (e.g., a slave process, a consumer, a producer, etc.) with a committed SCN for any user database object to be (read) accessed by the database server process in the read-mostly instance, even if such a user database object is concurrently being updated, or made available to be updated, by a database server process in a read-write instance. The database server process in the read-mostly instance can be configured to receive and/or cache a copy of a user database object with a committed SCN from the database (e.g., 108), or from the coordinator process, or from another database server process, etc.

Under other approaches, an instance usually broadcasts a committed system change number of a transaction to all other instances in a system, so that all the instances can advance their own system change numbers and be able to access the committed changes made by the transaction. Under techniques as described herein, in contrast, an instance does not need to broadcast a committed system change number to read-mostly instances in a multiple-instance database system but only broadcasts to read-write instances in the system if necessary.

No Resource Mastership for Read-Mostly Instances

In some embodiments, a read-mostly instance may be configured to generate no lock request. In some embodiments, a read-mostly instance may be configured to generate (e.g., very few such as 1%, 2%, 5%, 10%, etc., of an average number of lock requests generated by a read-write instance) share-lock requests but no exclusive-lock requests.

In some embodiments, a read-mostly instance may be configured to generate (e.g., very few such as 1%, 2%, 5%, 10%, etc., of an average number of lock requests generated by a read-write instance) exclusive-lock requests. In these embodiments, the exclusive-lock requests may be made by a system process so that the system process in the read-mostly instance can delete, update and/or create system database objects such as system logs and statistics.

Thus, read-mostly instances are expected to generate no or very few lock requests on their own. Furthermore, in some embodiments, none of the read-mostly instances, including but not limited to system processes thereon, may be configured or designated or elected as a resource master. As a result, the read-mostly instances are not burdened with tasks related to servicing lock requests from other instances in the system. Conversely, performance of servicing lock requests by the read-write instances (e.g., resource masters) in the system is not affected by the presence of a potentially large number of read-mostly instances in the same system.

A failure of a read-mostly instance, which does not master resources, does not trigger a (e.g., full-blown) reconfiguration of the multiple-instance database system. No resource re-mastering (or migration of the mastership of one or more resources from one instance to another instance) is necessary, since read-mostly instances do not master any resources to begin with. In the embodiments in which the read-mostly instance owns a small number of locks, the failure of the read-mostly instance still does not cause resource re-mastering but at most only triggers a cleanup of locks owned by the failed (or disappearing) read-mostly instance at masters (or read-write instances on which the masters reside) of resources previously reserved by the locks. Costly reconfiguration operations, including but not limited to rebuilding master maps, lock replays (or replaying lock requests to new masters), etc., which may have to be incurred at a failure of a read-write instance, can be avoided following the failure of the read-mostly instance. As a result, techniques as described herein achieve a high degree of fault and performance isolation of read-write instances from failures of read-mostly instances.

Adding or re-joining a read-mostly instance to the system also does not trigger a (e.g., full-blown) major reconfiguration of the multiple-instance database system. Active instance map may be updated by the instances of the system. However, no resource mastering is expected of the read-mostly instance. A coordinator process in a read-write instance for executing database statements may be configured to assign, based on the current active instance map, new operations (e.g., from existing database statements being executed or from newly received database statements to be executed) to the newly added read-mostly instance.

The multiple-instance database system can be configured to allow a read-mostly instance to "disappear" from the system for a certain period of time (or indefinitely) with no or little interruption on-going operations of the system. If a failed read-mostly instance was a part of an execution plan of a database statement, a coordinator process (e.g., a query coordinator or QC) may adapt the execution plan dynamically and re-assign query operations that were assign to the failed read-mostly instance to a different available instance. The database statement can be continually executed by available instances in the system without interruption. In some embodiments, instead of re-assigning operations from the failed read-mostly instance to a different available instance, the coordinator process may be configured to abort the previous execution plan and restart executing the database statement from the beginning (e.g., by forming a new execution plan that excludes the failed instance). Consequently, the failure of the read-mostly instance not only does not cause reconfiguration of the system, but also does not prevent the system from carrying out user jobs to successful ends.

In some embodiments, read-mostly instances can be specialized to achieve better performance in their designated types of applications/workloads than read-write instances, even with fewer hardware requirements than the read-write instances in some aspects. For example, instead of always generating redo log files, relatively small redo log files for read-mostly instances or log files can be generated on demand if needed to. The frequency of log switch (or switch between multiple log files) can be much lower in the read-mostly instance than the read-write instances.

Read-Write Instances

A read-write instance (e.g., 102A, 102B, etc.) can be configured with a relatively low IO latency than that of a write-mostly instance. The read-write instance may comprise database server processes that can be assigned with any operations of a database statement execution plan that may require write access to one or more user database objects in the database (e.g., 108). The read-write instance may be configured to perform resource locking protocols and access an up-to-date data when the data is being updated by other read-write instances.

A read-write instance can host a coordinator process that coordinates the execution of a database statement. Such a coordinator process can be configured to assign one or more operations for the execution of a database statement to database server processes—which may be spawned by the coordinator process, or which may have been spawned and thus are presently available—on multiple instances which may include the read-write instance. Zero, one or more of these assigned operations may require a database server process in a read-write instance to acquire exclusive locks to one or more user database objects, even if such a user database object is concurrently being updated, or made available to be updated, by another database server process in another read-write instance. Zero, one or more of these assigned operations may require a database server process in a read-write instance to acquire read access to one or more user database objects. Zero, one or more of these assigned operations may require a database server process in a read-mostly instance to acquire read access to one or more user database objects.

Resource Mastership for Read-Write Instances

In some embodiments, only read-write instances in a multiple-instance database system can be assigned with resource masterships (or as resource masters). The distribution of resources masters among the read-write instances provides advantages for both load balancing and availability. By distributing resource masters among the read-write instances, lock acquisitions by each resource requesting instance have more or less the same amount of lock latency. Furthermore, a failure of a read-write instance only affects a portion of resources and only that portion of resources needs to rebuild (or locate) their masters among the remaining available read-write instances. When a new read-write instance joins the system, some resources can be re-mastered to the new instance.

With hundreds of read mostly and read write instances, there are higher chances of instances going down and coming up. The number of reconfigurations (or system reconfigurations) due to failures of instances can be reduced or avoided by locating critical system functions such as resource masterships only to read-write instances but not read-mostly instances and by triggering reconfiguration only when a read-write instance fails. In some embodiments, the system may be configured with a relatively few read-write instances and a relatively large number of read-mostly instances (e.g., 2×, 3×, 5×, 10×, etc., of the number of read-write instances). The number of read-write instances can be configured in proportion to the number of read-mostly instances.

Reconfiguration involves a relatively large number of exchanges of inter-instance messages and affects system availability when multiple instances are involved in exchanging and broadcasting messages. Under techniques as described herein, even when reconfiguration does occur, only a relatively small number of instances (e.g., read-write instances) as necessary are involved, and reconfiguration can be completed relatively quickly.

Example Process Flow

Figure 2:
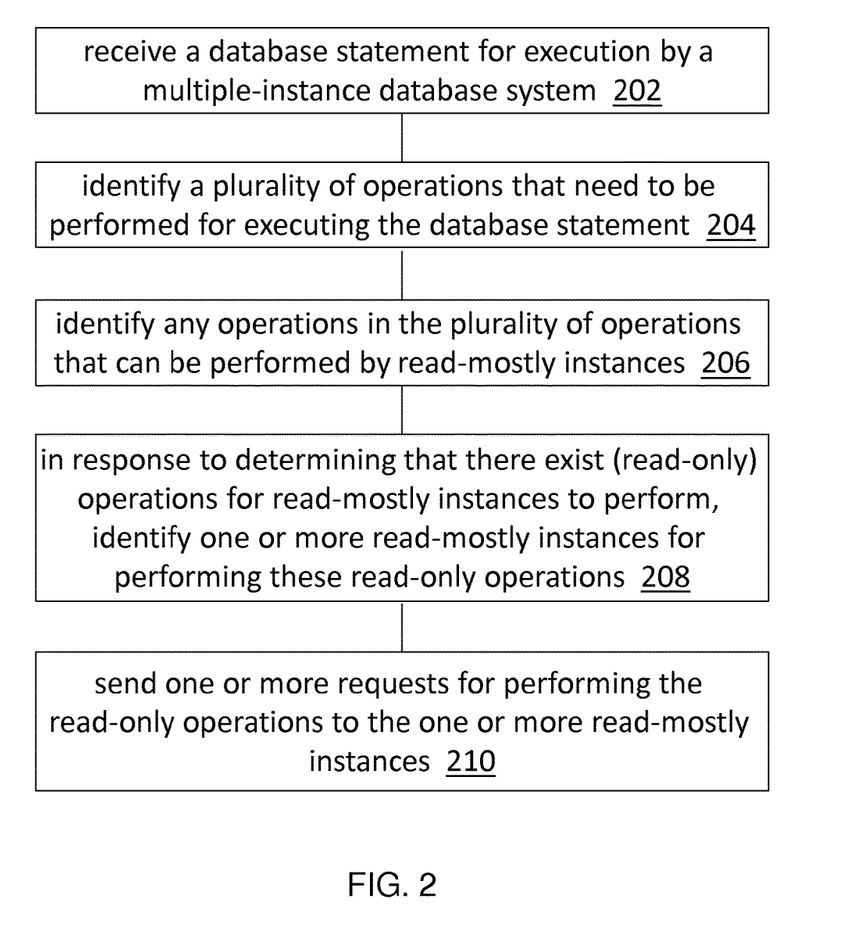
FIG. 2 is an example process flow, according to an embodiment of the invention.

FIG. 2 is an example process flow, according to an embodiment of the invention. A coordinator instance (e.g., in a read-write instance 102A or 102B) performs the following steps.

In block 202, the coordinator instance receives a database statement for execution by a multiple-instance database system. The database statement may be any of DDLs, DMLs, database queries, etc.

In block 204, the coordinator instance identifies a plurality of operations that need to be performed for executing the database statement.

In block 206, the coordinator instance identifies any operations in the plurality of operations that can be performed by read-mostly instances. If the database statement is a database query (e.g., from DSS users or applications), most if not all of the operations to carry out the database query can be performed by read-mostly instances. If the database statement is, for example, an INSERT-SELECT statement, operations for executing the "SELECT" part of the INSERT-SELECT statement can be performed by read-mostly instances, while operations for executing the "INSERT" part of the INSERT-SELECT statement can only be performed by read-write instances.

In block 208, the coordinator instance, in response to determining that there exist (read-only) operations for read-mostly instances to perform, further identifies one or more read-mostly instances for performing these read-only operations. The coordinator instance may determine a desired degree of parallelism to perform one or more of these read-only operations. The coordinator instance may determine the number of currently available read-mostly instances. Based at least in part on these factors, the one or more read-mostly instances are identified by the coordinator instance.

In block 210, the coordinator instance sends one or more requests for performing the read-only operations to the one or more read-mostly instances. A request may comprise a runtime execution plan or one or more portions of a runtime execution plan. In some embodiments, a receiving instance of a runtime execution plan does not need to re-compile the runtime execution plan. In some embodiments, for a user database object to be read for the purpose of carrying out a read-only operation, the coordinator instance provides a committed SCN associated with the user database object. A consistent-read copy of the user database object comprising an image of the user database object at a logical time represented by the committed SCN can be provided by the system to a read-mostly instance involved in executing the database statement. In an example, the coordinator instance may fetch the consistent-read copy at the time of generating the runtime execution plan. In another example, the coordinator or the read-mostly instance may fetch the consistent-read copy on demand when executing the operation that requires read access to the user database object.

The coordinator instance may be configured to receive results of the read-only operations from the read-mostly instances. The coordinator may also be configured to receive results of other operations for executing the database statement from one or more read-write instances if the other operations for executing the database statement were assigned to the one or more read-write instances. These other operations to the read-write instances may be read-only operations or operations involving write access to user database objects in the database (108). The coordinator instance may be configured to consolidate results from all instances involved in executing the database statement, including but not necessarily limited only to the one or more read-mostly instances.

In some embodiments, a runtime execution plan of a database statement may be optimized after compilation and provided to all the participating instances on which database server processes are invoked to perform operations in relation to the database statement. One or more database server processes in the participating instances may be available at the time when the coordinator instance sends the requests for performing operations to the participating instances. One or more database server processes may be spawned or caused to be spawned by the coordinator instance at the time when the coordinator instance needs to send the requests for performing operations to the participating instances.

In some embodiments, a runtime execution plan may define the same memory space for all the participating instances to use. An instance may verify the runtime execution plan by computing and verifying a signature of the plan and compare signatures.

Techniques as described herein can be used to facilitate running large data warehouse applications/workloads on very large clusters of machines. In some embodiments, data that are accessed by multiple database statements or by multiple parts of a database statement can be placed into aggregated memory spaces and fetched by parallel servers using algorithms or operations that preserve affinity (e.g., related data resides nearby each other) across many database statements or many parts of a database statement or different instances or different database servers on the same instance.

Techniques as described herein can be used with a wide variety of other techniques and implemented in one or more different logical layers (e.g., parallel query, recovery, buffer cache, statistics collection, etc.) of a multiple-instance database systems to provide (e.g., customized) solutions for private cloud/hardware consolidation, near real time query performance, dynamic and distributed processing, etc.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 3:
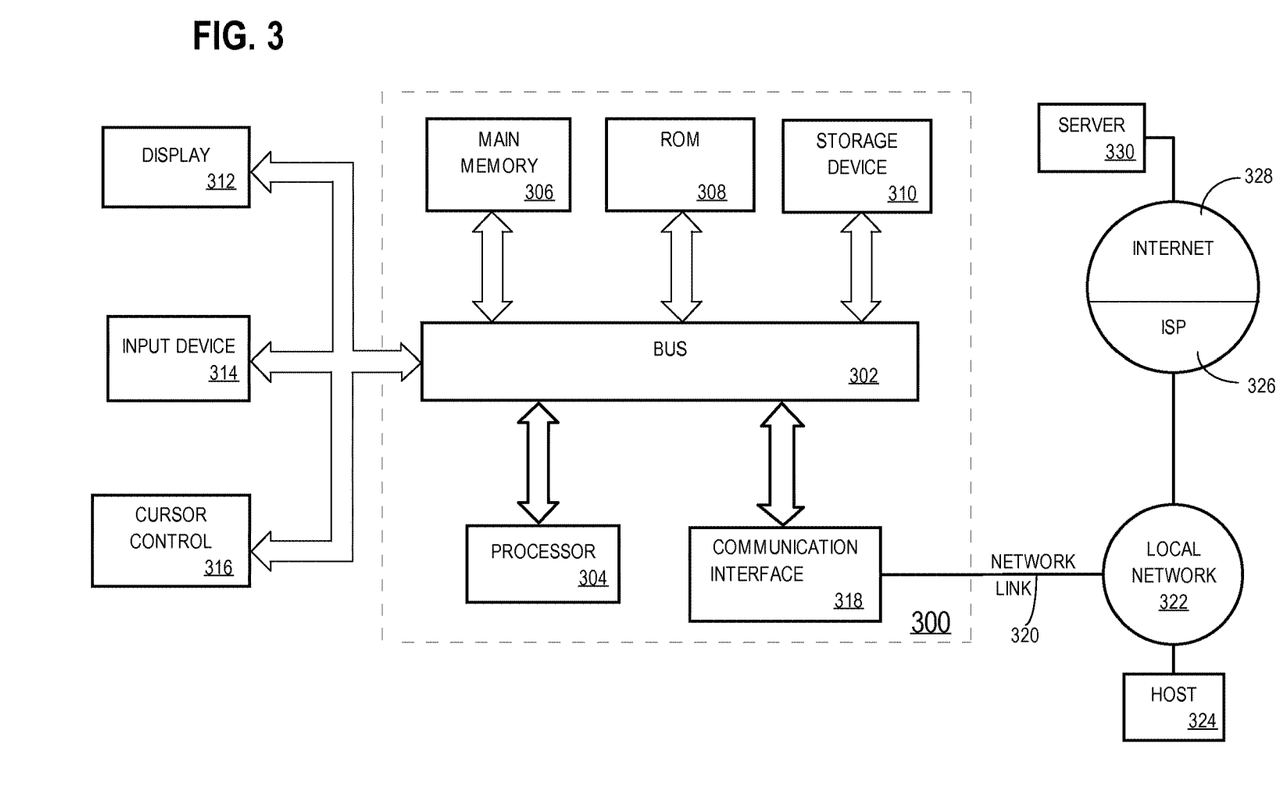
FIG. 3 is a block diagram illustrating a computer system on which embodiments of the invention may be implemented.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in non-transitory storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk, optical disk, or solid-state drive is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 310. Volatile media includes dynamic memory, such as main memory 306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid-state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through a network to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A multi-instance database system comprising one or more computing devices, the multi-instance database system comprising:
    a database storing a plurality of user data objects;
    a plurality of database server instances sharing direct access to the database;
    wherein the plurality of database server instances comprises a plurality of read-write database server instances configured with read access and write access to the plurality of user data objects;
    wherein the plurality of database server instances comprises a plurality of read-mostly database server instances configured with only read access to the plurality of user data objects; and
    a read-write database server instance configured to:
        select one or more read-mostly database server instances, in the plurality of read-mostly database server instances, to perform one or more operations that require no write access to the plurality of user data objects;
        send, to a read-mostly database server instance of the one or more read-mostly database server instances, an execution plan for accessing the plurality of user data objects and a system change number (SCN) associated with the execution plan;
    the read-mostly database server instance configured to execute the execution plan, wherein executing the execution plan comprises accessing one or more user data objects of the plurality of user data objects using the SCN.

2. The multi-instance database system of claim 1, wherein the one or more operations are among a plurality of operations to execute a database statement.

3. The multi-instance database system of claim 2, wherein the database statement is one of a database query statement, a data manipulation language (DML) statement, or a data definition language (DDL) statement.

4. The multi-instance database system of claim 1, wherein the read-write database server instance is further configured to select only one or more read-write database server instances in the plurality of read-write database server instances, to perform one or more second operations that require write access to the plurality of user data objects.

5. The multi-instance database system of claim 1, wherein none of the plurality of read-mostly database server instances is configured to be resource masters of resources in the database.

6. The multi-instance database system of claim 1, wherein none of the plurality of read-mostly database server instances is configured to receive a database statement from a user.

7. A method comprising:
    a read-write database server instance of a multiple-instance database system receiving a database statement for execution, wherein the multiple-instance database system comprises a database shared by a plurality of read-mostly database server instances configured with only read access to a plurality of user database objects in the database and a plurality of read-write database server instances configured with both read access and write access to the plurality of user database objects; and
    the read-write database server instance selecting one or more read-mostly database server instances, in the plurality of read-mostly database server instances, to perform one or more operations that require no write access to the plurality of user data objects;

sending, to a read-mostly database server instance of the one or more read-mostly database server instances, an execution plan for accessing the plurality of user database objects and a system change number (SCN) associated with the execution plan;

the read-mostly database server instance executing the execution plan, wherein executing the execution plan comprises accessing one or more user database objects of the plurality of user data objects using the SCN;

wherein the method is performed by one or more computing devices.

8. The method of claim 7, wherein the one or more operations are among a plurality of operations to execute a database statement.

9. The method of claim 8, wherein the database statement is one of a database query statement, a data manipulation language (DML) statement, or a data definition language (DDL) statement.

10. The method of claim 7, wherein the read-write database server instance is further configured to select one or more read-write database server instances in the plurality of read-write database server instances, to perform one or more second operations that require write access to the plurality of user data objects.

11. The method of claim 7, wherein none of the plurality of read-mostly database server instances is configured to be resource masters to resources of the database.

12. The method of claim 7, wherein none of the plurality of read-mostly database server instances is configured to receive a database statement from a user.

13. The method of claim 7, wherein the plurality of read-write database server instances and the plurality of read-mostly database server instances share direct access to the database.

14. One or more non-transitory computer-readable media storing instructions which, when executed by one or more processors, cause:

a read-write database server instance of a multiple-instance database system receiving a database statement for execution, wherein the multiple-instance database system comprises a database shared by a plurality of read-mostly database server instances configured with only read access to a plurality of user database objects in the database and a plurality of read-write database server instances configured with both read access and write access to the plurality of user database objects; and the read-write database server instance selecting one or more read-mostly database server instances, in the plurality of read-mostly database server instances, to perform one or more operations that require no write access to the plurality of user data objects;

sending, to a read-mostly database server instance of the one or more read-mostly database server instances, an execution plan for accessing the plurality of user database objects and a system change number (SCN) associated with the execution plan;

the read-mostly database server instance executing the execution plan, wherein executing the execution plan comprises accessing one or more user database objects of the plurality of user data objects using the SCN.

15. The one or more media of claim 14, wherein the one or more operations are among a plurality of operations to execute a database statement.

16. The one or more media of claim 14, wherein the read-write database server instance is further configured to select one or more read-write database server instances in the plurality of read-write database server instances, to perform one or more second operations that require write access to the plurality of user data objects.

17. The one or more media of claim 14, wherein none of the plurality of read-mostly database server instances is configured to be resource masters of resources of the database.

18. The one or more media of claim 14, wherein none of the plurality of read-mostly database server instances is configured to receive a database statement from a user.

19. The one or more media of claim 14, wherein the plurality of read-write database server instances and the plurality of read-mostly database server instances share direct access to the database.

* * * * *